(12) United States Patent
Larose, Jr. et al.

(10) Patent No.: US 9,046,019 B2
(45) Date of Patent: Jun. 2, 2015

(54) SYSTEM AND METHOD FOR PARTICULATE FILTER REGENERATION

(75) Inventors: Thomas Larose, Jr., Howell, MI (US); David Michael Van Buren, Livonia, MI (US); John A. Catalogna, Commerce Township, MI (US); Christopher Whitt, Howell, MI (US); Rebecca J. Darr, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 319 days.

(21) Appl. No.: 13/289,039

(22) Filed: Nov. 4, 2011

(65) Prior Publication Data

US 2013/0111877 A1 May 9, 2013

(51) Int. Cl.
| | |
|---|---|
| *F01N 3/00* | (2006.01) |
| *F01N 3/10* | (2006.01) |
| *F01N 3/20* | (2006.01) |
| *F01N 9/00* | (2006.01) |
| *F01N 3/023* | (2006.01) |
| *F01N 3/025* | (2006.01) |
| *F01N 3/029* | (2006.01) |

(52) U.S. Cl.
CPC ............... *F01N 3/103* (2013.01); *F01N 3/106* (2013.01); *F01N 3/2066* (2013.01); *F01N 3/208* (2013.01); *F01N 9/002* (2013.01); *F01N 3/0231* (2013.01); *F01N 3/0253* (2013.01); *F01N 3/029* (2013.01); *Y02T 10/47* (2013.01); *Y02T 10/24* (2013.01)

(58) Field of Classification Search
USPC .................................................. 60/272–324
See application file for complete search history.

(56) References Cited

U.S. PATENT DOCUMENTS

| | | | |
|---|---|---|---|
| 6,928,806 B2 * | 8/2005 | Tennison et al. ................. | 60/286 |
| 7,104,050 B2 * | 9/2006 | Sato et al. ........................ | 60/295 |
| 7,383,118 B2 * | 6/2008 | Imai et al. ...................... | 701/104 |
| 8,161,738 B2 * | 4/2012 | He et al. .......................... | 60/296 |
| 8,621,846 B2 * | 1/2014 | Thomas ........................... | 60/286 |
| 2005/0056009 A1 * | 3/2005 | Otake et al. ..................... | 60/311 |
| 2007/0234711 A1 * | 10/2007 | Berke et al. ..................... | 60/295 |
| 2011/0000190 A1 * | 1/2011 | Svensson et al. ............... | 60/274 |
| 2012/0144802 A1 * | 6/2012 | Driscoll et al. ................. | 60/274 |
| 2013/0125745 A1 * | 5/2013 | Bromberg et al. .............. | 95/14 |

* cited by examiner

*Primary Examiner* — Thomas Denion
*Assistant Examiner* — Kelsey Stanek
(74) *Attorney, Agent, or Firm* — Cantor Colburn LLP

(57) ABSTRACT

In one exemplary embodiment of the invention, a method of regenerating a particulate filter includes flowing an exhaust gas from an internal combustion engine into a particulate filter and determining a particulate level in the particulate filter. The method also includes performing a primary regeneration when the particulate level is below a first value, the primary regeneration including flowing exhaust gas with a selected amount of hydrocarbons in the exhaust gas into the particulate filter, and performing a secondary regeneration when the particulate level is above the first value, the secondary regeneration including flowing exhaust gas with an increased amount of nitrogen oxide into the particulate filter.

19 Claims, 1 Drawing Sheet

SYSTEM AND METHOD FOR PARTICULATE FILTER REGENERATION

FIELD OF THE INVENTION

The subject invention relates to internal combustion engines, and, more particularly, to exhaust aftertreatment systems for internal combustion engines.

BACKGROUND

An engine control module of an internal combustion engine controls the mixture of fuel and air supplied to combustion chambers of the engine. After the air/fuel mixture is ignited, combustion takes place and the combustion gases exit the combustion chambers through exhaust valves. The combustion gases are directed by an exhaust manifold to a catalyst (or "catalytic converter") and/or other exhaust aftertreatment components.

During engine operation, certain exhaust aftertreatment components are configured to remove selected regulated constituents from the exhaust gas. An exemplary component is a particulate filter configured to remove carbon particles or particulates that result from incomplete combustion of a hydrocarbon fuel, also referred to as particulates, from the exhaust gas. An exemplary particulate filter is configured to remove a selected amount of particulates and periodically burn off the accumulated particulates through a regeneration process. Regeneration and removal of excess particulates prevents excessive backpressure for the internal combustion engine, which can lead to repair and maintenance issues. In some situations, the engine may not be run at optimal engine conditions to allow a regeneration to be performed. This can lead to particulate buildup to levels that cannot be burned off during later regeneration attempts.

SUMMARY OF THE INVENTION

In one exemplary embodiment of the invention, a method of regenerating a particulate filter includes flowing an exhaust gas from an internal combustion engine into a particulate filter and determining a particulate level in the particulate filter. The method also includes performing a primary regeneration when the particulate level is below a first value, the primary regeneration including flowing exhaust gas with a selected amount of hydrocarbons into the particulate filter, and performing a secondary regeneration when the particulate level is above the first value, the secondary regeneration including flowing exhaust gas with an increased amount of nitrogen oxide into the particulate filter.

In another exemplary embodiment of the invention, an internal combustion engine system includes an internal combustion engine, an exhaust gas conduit in fluid communication with, and configured to receive an exhaust gas from, the internal combustion engine and a particulate filter to receive flow of the exhaust gas from the exhaust gas conduit. The system also includes a controller configured to determine a particulate level in the particulate filter, and to generate a command to perform a passive regeneration when the particulate level is above a first value, the passive regeneration including flowing exhaust gas with an increased amount of nitrogen oxide into the particulate filter.

The above features and advantages and other features and advantages of are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION OF THE EMBODIMENTS

Figure 1:
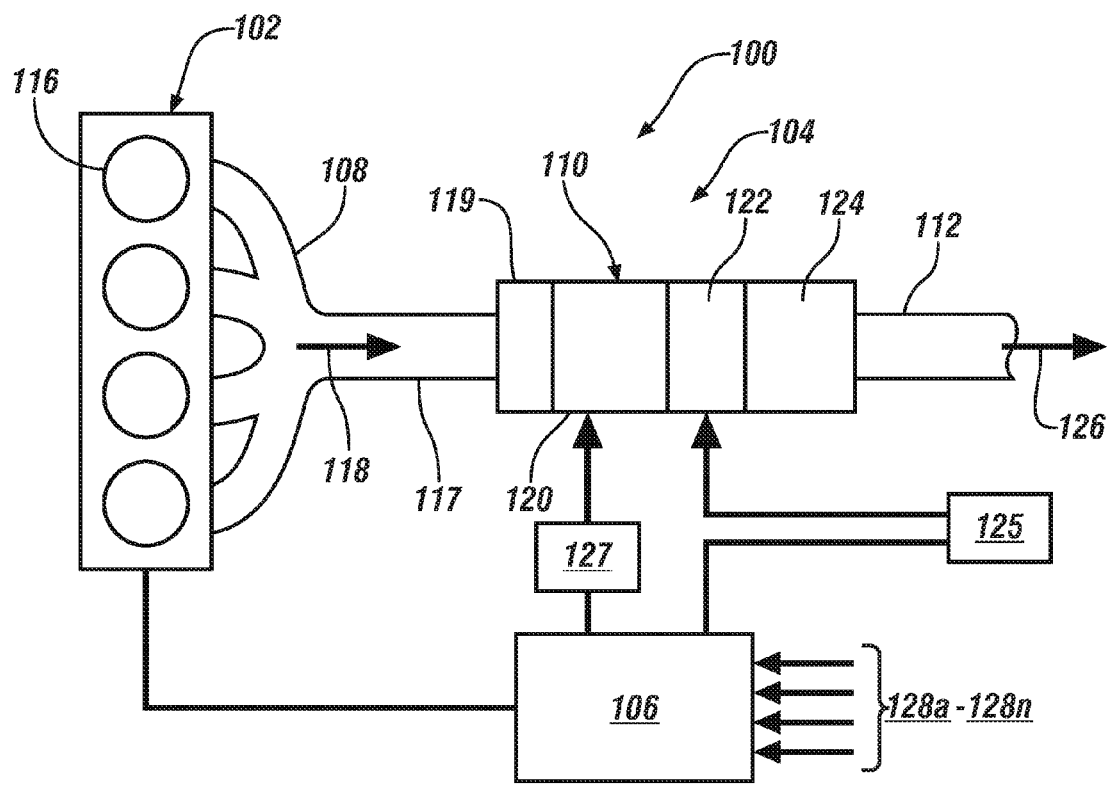
FIG. 1 illustrates an exemplary internal combustion engine including an exemplary exhaust aftertreatment system.

The following description is merely exemplary in nature and is not intended to limit the present disclosure, its application or uses. It should be understood that throughout the drawings, corresponding reference numerals indicate like or corresponding parts and features. As used herein, the terms controller and module refer to an application specific integrated circuit (ASIC), an electronic circuit, a processor (shared, dedicated, or group) and memory that executes one or more software or firmware programs, a combinational logic circuit, and/or other suitable components that provide the described functionality. In embodiments, a controller or module may include one or more sub-controllers or sub-modules.

FIG. 1 is a schematic diagram of an embodiment of an engine system 100. The engine system 100 includes an internal combustion engine 102, an exhaust system 104 and an engine controller 106. The exhaust system 104 includes an exhaust manifold 108, an exhaust aftertreatment system 110 and an exhaust conduit 112. Cylinders 116 are located in the internal combustion engine 102, wherein the cylinders 116 receive a combination of combustion air and fuel. The combustion air/fuel mixture is combusted resulting in reciprocation of pistons (not shown) located in the cylinders 116. The reciprocation of the pistons rotates a crankshaft (not shown) to deliver motive power to a vehicle powertrain (not shown) or to a generator or other stationary recipient of such power (not shown) in the case of a stationary application of the internal combustion engine 102. The combustion of the air/fuel mixture causes a flow of exhaust gas 118 through the exhaust manifold 108, an exhaust conduit 117 and into the exhaust gas aftertreatment system 110, wherein the exhaust aftertreatment system 110 may include a first oxidation catalyst 119, a selective catalytic reduction ("SCR") device 120, a second oxidation catalyst 122 and a particulate filter 124. The exhaust aftertreatment system 110 reduces, oxidizes, traps or otherwise treats various regulated constituents and pollutants of the exhaust gas 118, such as particulates, prior to its release to the atmosphere.

The first and second oxidation catalysts 119, 122 may each include, for example, a flow-through metal or ceramic monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduit 117. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts. The SCR device 120 may also include, for example, a flow-through ceramic or metal monolith substrate that is wrapped in an intumescent mat or other suitable support that expands when heated, securing and insulating the substrate. The substrate may be packaged in a stainless steel shell or canister having an inlet and an outlet in fluid communication with exhaust gas conduit 117. The substrate can include an SCR catalyst composition applied thereto. The SCR catalyst composition may contain a zeolite and one or more base metal components such as iron (Fe), cobalt (Co), copper (Cu) or vanadium which can operate efficiently to convert NOx constituents in the exhaust gas 118 in the presence of a reductant such as ammonia ($NH_3$). An $NH_3$ reductant may be supplied from a fluid supply 125 (reductant supply) and may be injected into the exhaust gas 118 at a location upstream of the SCR device 120 using an injector. The reductant may be in the form of a gas, a liquid, or an aqueous urea solution and may be mixed with air in the injector to aid in the dispersion of the injected spray. A mixer may also be disposed within exhaust aftertreatment system to further assist in mixing of the reductant with the exhaust gas 118. In an embodiment, the second fluid supply 127 may include a hydrocarbon supply. The hydrocarbon supply may be instead of, or in addition to, the reductant supply, depending upon system configuration.

In an embodiment, the exhaust aftertreatment system 110 and fluid supplies 125, 127 are operationally coupled to and controlled by the engine controller 106 (also referred to as "module"). The engine controller 106 collects information regarding the operation of the internal combustion engine 102 from sensors 128a-128n, such as temperature (intake system, exhaust system, engine coolant, ambient, etc.), pressure, exhaust flow rates, particulate levels and NOx concentrations. The engine controller 106 may adjust the amount of $NH_3$ reductant 125 or another suitable emission reducing fluid injected into the exhaust aftertreatment system 110. Further, the controller 106 may also be configured to perform selected processes or operations based on the sensed parameters, such as regeneration processes based on sensed particulate levels in the particulate filter 124. In an exemplary embodiment, the exhaust gas flow 118 is received by the first oxidation catalyst 119, which may be closely-coupled to the engine 102, to remove pollutants and to conform to emissions regulations.

The particulate filter 124 may be disposed downstream of the SCR device 120. The particulate filter 124 operates to filter the exhaust gas 118 of carbon and other particulates. In embodiments, the particulate filter 124 may be constructed using a ceramic wall flow monolith filter that is wrapped in an insulating mat or other suitable support that secures and insulating the filter. The filter may be packaged in a shell or canister that is, for example, stainless steel, and that has an inlet and an outlet in fluid communication with exhaust gas conduit 117. The ceramic wall flow monolith filter may have a plurality of longitudinally extending passages that are defined by longitudinally extending walls. The passages include a subset of inlet passages that have and open inlet end and a closed outlet end, and a subset of outlet passages that have a closed inlet end and an open outlet end. Exhaust gas 118 entering the filter through the inlet ends of the inlet passages is forced to migrate through adjacent longitudinally extending walls to the outlet passages. It is through this exemplary wall flow mechanism that the exhaust gas 118 is filtered of carbon and other particulates. The filtered particulates are deposited on the longitudinally extending walls of the inlet passages and, over time, will have the effect of increasing the exhaust gas backpressure experienced by the internal combustion engine 102. It should be understood that the ceramic wall flow monolith filter is merely exemplary in nature and that the particulate filter 124 may include other filter devices such as wound or packed fiber filters, open cell foams, sintered metal fibers, etc.

The accumulation of particulate matter within the particulate filter 124 is periodically cleaned, or regenerated to reduce backpressure. Regeneration involves the oxidation or burning of the accumulated carbon and other particulates (also including soot) in what is typically a high temperature (e.g. at or above 600° C.) environment. In an embodiment, an elevated particulate level is sensed in the particulate filter 124 by sensors 128a-128n in signal communication with controller 106 and a regeneration may be performed. An exemplary regeneration process includes an introduction of heat into the exhaust aftertreatment system 110 by introducing fuel 127 (hydrocarbons or HC) into the exhaust gas 118 to oxidize over the oxidation catalyst 122 to increase a temperature of the exhaust gas 118 entering the particulate filter 124.

During operation of the exemplary internal combustion engine system 100, primary regeneration (also referred to as "hydrocarbon regeneration") may be performed over an extended time period, such as 10 to 30 minutes, to reduce particulates to a normal or acceptable level. Some systems require the engine 102 to be warmed up for regeneration. As a result, short engine operating periods (e.g., 5 minutes) or start-stop operation may not provide sufficient time for the engine to warm up to begin regeneration. Repeated short operating periods may lead to elevated particulate accumulation that is too high for primary regeneration (also referred to "hydrocarbon or HC regeneration") without the risk of damaging the hardware (e.g., particulate filter). In embodiments, elevated particulate levels that cannot be reduced via primary regeneration may cause the engine to operate in a power-limiting mode until a manual regeneration process is performed in controlled conditions at a service center, such as a dealer or service center. Accordingly, a method and system are provided for the exhaust aftertreatment system 110 to enable secondary regeneration (also referred to as "passive regeneration") of the particulate filter 124 when particulate levels are too high for treatment by primary regeneration processes to avoid unwanted vehicle downtime caused by the need for manual regeneration. It should be noted that the engine system 100 could have many alternative configurations, including fewer or more components than depicted. In one embodiment, the system may include a single oxidation catalyst 119 and a single particulate filter 124.

Figure 2:
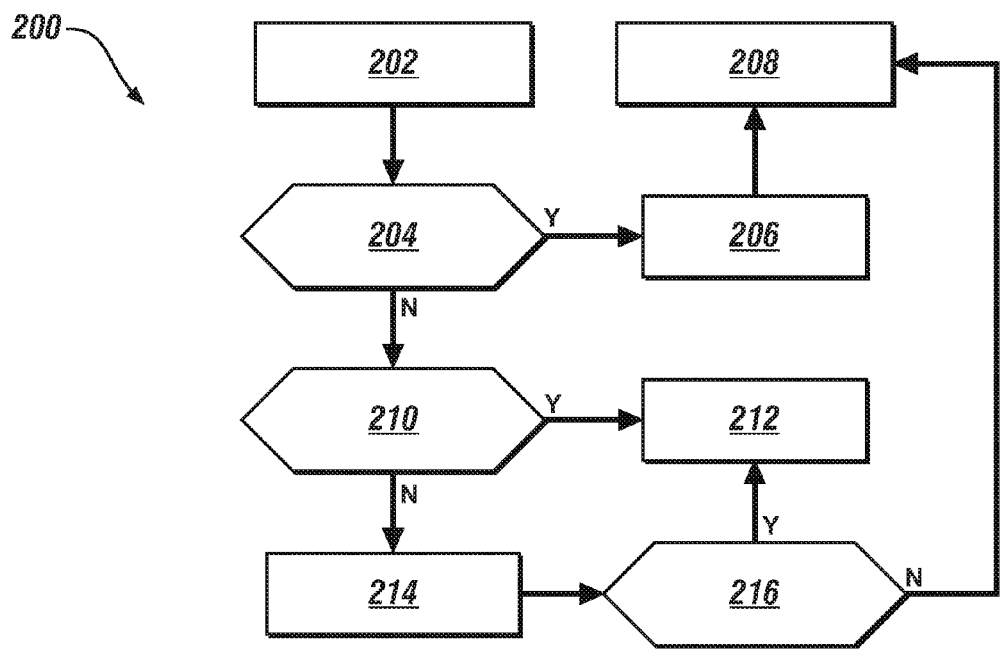
FIG. 2 is a diagram of an exemplary process for regeneration of a particulate filter in the exhaust aftertreatment system.

FIG. 2 is a block diagram of an exemplary process 200 for particulate regeneration in an exhaust aftertreatment system 110 (FIG. 1). In an embodiment, the exhaust after treatment system 110 receives the exhaust gas 118 from the internal combustion engine 102 and flows the exhaust gas through the first oxidation catalyst 119, the SCR device 120, the second oxidation catalyst 122 and into the particulate filter 124. In block 202, an elevated particulate level is sensed in the particulate filter 124 by a suitable sensing device, such as a backpressure sensor or sensors placed along the exhaust gas flow path. In one embodiment, the particulate level may be sensed by determining a differential pressure between the inlet and the outlet of the filter, wherein increased particulate levels are indicated by larger pressure differentials across the filter 124. The exemplary values for elevated particulate levels may vary depending on the engine, environment, fuel type and other factors. In one embodiment, an elevated particulate level is greater than about 40 grams of particulate in the filter. If the particulate level is not elevated, the engine 102 (FIG. 1) operates normally. In block 204, a determination is made if the particulate level is below a lower limit for passive regeneration. An exemplary lower limit for passive regeneration may be about 70 grams of particulate in the filter. In block 206, an exemplary primary regeneration process is initiated if the particulate level is below the lower limit. The primary regeneration process may burn hydrocarbons (HC) 127 to provide heat to burn the particulates. After primary regeneration, the particulate level is reduced to a "normal level" where normal engine operation may resume, as shown in block 208. As described herein, a normal particulate level is a particulate level in the particulate filter 124 that does not cause excessive backpressure for the engine 102 and is less than a threshold or lower limit for initiation of primary regeneration.

In block 210, a determination is made if the sensed particulate level is between the lower limit and upper limit for passive regeneration or if the particulate level exceeds the upper limit for passive regeneration. An exemplary upper limit for passive regeneration may be a particulate level of about 75 grams. If the particulate level exceeds the upper limit, the internal combustion engine system 100 (FIG. 1) indicates that engine service is needed to the operator, as shown in block 212. In an example, the engine operates in a power-limiting or low power mode until it is taken to a service center. As depicted in block 214, if the particulate level is below the upper limit for passive regeneration, then a secondary or passive regeneration is initiated. The passive regeneration may occur while the engine is operating in a substantially normal manner, thus allowing continued use without interruption for the operator. In an embodiment, the passive regeneration process includes running the engine system 100 to produce increased amounts of NOx (nitric oxide and nitrogen dioxide). Increased NOx in the exhaust gas will produce additional chemical reaction that causes the particulates to "burn off" from a substrate of the particulate filter 124 (FIG. 1). In an aspect, the high NOx passively regenerates the particulates at lower temperatures than a hydrocarbon regeneration process. In an embodiment, hydrocarbon regeneration may not be performed at higher particulate levels because the drive cycle may lead to rapid burning of the particulates that causes undesirably high temperatures. Any suitable adjustment or action for the engine system 100 may be used to produce additional NOx. In an example, the controller 106 may cause the engine system 100 to adjust fuel and air mixture ratios to produce NOx. In another example, an exhaust gas recirculation (EGR) system may reduce the flow of recirculated exhaust gas into the engine, which may cause increased NOx production.

In block 216, the time used to perform the passive regeneration process is monitored. In an embodiment, the particulate level is sensed during the process to determine if the passive regeneration process should continue. If the passive regeneration reduces the particulate level to a normal level under a selected time limit, the engine system 100 resumes normal operation (block 208). If the passive regeneration process continues to run without reducing the particulate level to the acceptable level in the selected time limit, the operator will be notified that service is needed (block 212). The time limit in block 216 may vary depending on engine configuration and other factors. An exemplary time limit may range from about 10 minutes to about 30 minutes. In an aspect, about one gram of particulates is removed about every three to four minutes. The exemplary regeneration process 200 may utilize any suitable equipment, such as hardware, processors and software, to perform the logic, control and commands described herein. In an exemplary embodiment, one or more control module, such as controller 106 (FIG. 1), may be used to perform the illustrated steps of the process 200. The method and apparatus depicted in FIGS. 1 and 2 provide improved performance for exhaust aftertreatment systems by removing particulates via passive process. The secondary or passive regeneration enables burn off of excessive particulates build up during substantially normal engine operation, thereby avoiding downtime associated with a manual regeneration performed by a dealer or service technician.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of regenerating a particulate filter comprising:
flowing an exhaust gas from an internal combustion engine into a particulate filter;
determining a particulate level in the particulate filter;
performing a primary regeneration when the particulate level is below a first value, the primary regeneration comprising flowing exhaust gas with a selected amount of hydrocarbons in the exhaust gas into the particulate filter;
increasing, when the particulate level is above the first value, an amount of nitrogen oxide in the exhaust gas from the engine by at least one of reducing EGR flow to the engine and adjusting an engine air to fuel ratio to produce increased nitrogen oxide; and
performing a secondary regeneration when the particulate level is above the first value, the secondary regeneration comprising flowing exhaust gas from the engine with an increased amount of nitrogen oxide into the particulate filter,
wherein the primary regeneration is performed when the particulate level is between 40 g and 70 g, and the secondary regeneration is performed when the particulate level is between 70 g and 75 g.

2. The method of claim 1, wherein the first value is greater than a second value comprising a particulate level at or below which the primary regeneration reduces the particulate level in the particulate filter to a normal particulate level.

3. The method of claim 2, wherein a range from the first value and a third value comprises particulate level at which the secondary regeneration reduces the particulate level in the particulate filter at or below the first value, wherein the first value is less than the third value.

4. The method of claim 3, comprising indicating to an operator that the particulate level is above an acceptable level for a regeneration operation and that service is needed when the particulate level is greater than the third value.

5. The method of claim 3, comprising indicating to an operator that service is needed when the secondary regeneration exceeds a time limit.

6. The method of claim 1, wherein flowing exhaust gas with the increased amount of nitrogen oxide into the particulate filter causes particulate level to be reduced to a normal level.

7. The method of claim 1, wherein flowing exhaust gas with the increased amount of nitrogen oxide into the particulate filter causes burning of particulates in the particulate filter at a temperature less than a temperature of the primary regeneration.

8. The method of claim 1, wherein determining the particulate level in the particulate filter comprises determining a pressure difference across the particulate filter.

9. An internal combustion engine system comprising:
an internal combustion engine;

an exhaust gas conduit in fluid communication with, and configured to receive an exhaust gas from, the internal combustion engine;
a particulate filter configured to receive flow of the exhaust gas from the exhaust gas conduit; and
a controller configured to:
determine a particulate level in the particulate filter;
generate a command to perform a passive regeneration when the particulate level is above a first value and below a second value, the passive regeneration comprising flowing exhaust gas with an increased amount of nitrogen oxide into the particulate filter;
generate a command to cause the engine to produce increased amounts of nitrogen oxides when the passive regeneration occurs;
generate a command to perform the passive regeneration for a predetermined amount of time;
generate a command to notify an operator that service is needed when the particulate level is not reduced to the first value in the predetermined amount of time; and
generate a command to perform a hydrocarbon regeneration when the particulate level is below the first value, the hydrocarbon regeneration comprising flowing exhaust gas with a selected amount of hydrocarbon in the exhaust gas into the particulate filter,
wherein the hydrocarbon regeneration is performed when the particulate level is between 40 g and 70 g, and the passive regeneration is performed when the particulate level is between 70 g and 75 g.

10. The system of claim 9, wherein the first value is greater than a third value comprising a particulate level at or below which the hydrocarbon regeneration reduces the particulate level in the particulate filter to a normal level.

11. The system of claim 10, wherein a range from the first value to the second value comprises a particulate level at which the passive regeneration reduces the particulate level in the particulate filter at or below the first value, wherein the first value is less than the second value.

12. The system of claim 11, wherein the controller is configured to indicate to an operator that the particulate level is above an acceptable level for regeneration and service is needed when the particulate level is greater than the second value.

13. The system of claim 9, wherein the passive regeneration comprises flowing exhaust gas with the increased amount of nitrogen oxide into the particulate filter causes particulate level to be reduced to a normal range.

14. The system of claim 9, wherein the passive regeneration comprises flowing exhaust gas with the increased amount of nitrogen oxide into the particulate filter causing burning of particulates in the particulate filter at a temperature less than a temperature of a hydrocarbon regeneration.

15. The system of claim 9, wherein determining the particulate level in the particulate filter comprises determining a pressure difference across the particulate filter.

16. The system of claim 9, further comprising:
a first oxidation catalyst positioned upstream of the particulate filter;
a catalytic reduction device positioned upstream of the first oxidation catalyst;
a second oxidation catalyst positioned upstream of the catalytic reduction device;
a reductant injector in fluid communication with the exhaust gas conduit and configured to inject a reductant into the exhaust gas upstream of the particulate filter and downstream of the catalytic reduction device; and
a hydrocarbon injector in fluid communication with the exhaust gas conduit and configured to inject a hydrocarbon into the exhaust gas upstream of the first oxidation catalyst and downstream of the second oxidation catalyst.

17. A method for regenerating an exhaust gas particulate filter system for an internal combustion engine having an exhaust gas conduit in fluid communication with, and configured to receive an exhaust gas from, the internal combustion engine, a particulate filter for removal of particulates from the exhaust gas; comprising:
sensing a particulate level in the particulate filter;
determining that the particulate has exceeded a level indicating the need for a passive regeneration of the particulate filter to burn particulates collected therein;
causing an increase in an amount of nitrogen oxide in exhaust gas received by the particulate filter, wherein the amount of nitrogen oxide burns the particulates;
determining that the particulate is below the level, thereby indicating the need for a primary regeneration of the particulate filter to burn the particulates collected therein; and
causing an increase in an amount of hydrocarbons in exhaust gas received by the particulate filter, wherein the amount of hydrocarbons facilitates burning the particulates,
wherein the primary regeneration is performed when the particulate level is between 40 g and 70 g, the passive regeneration is performed when the particulate level is between 70 g and 75 g, and a service light is operated when the particulate level is above 75 g.

18. The method of claim 17, comprising:
determining if the passive regeneration exceeds a selected time; and
indicating the particulate level is above an acceptable limit and a particulate filter service is needed when the selected time is exceeded.

19. The system of claim 9, wherein the controller is further configured to generate the command to cause the engine to produce increased amounts of nitrogen oxides when the passive regeneration occurs by reducing an EGR flow to the engine and adjusting the engine to adjust an air to fuel ratio to produce increased nitrogen oxides.

* * * * *